United States Patent [19]

Trietley, Jr.

[11] 4,311,982
[45] Jan. 19, 1982

[54] TRIMMABLE WIREWOUND RESISTANCE TEMPERATURE TRANSDUCER

[75] Inventor: Harry L. Trietley, Jr., Yellow Springs, Ohio

[73] Assignee: The Yellow Springs Instrument Company, Inc., Yellow Springs, Ohio

[21] Appl. No.: 174,409

[22] Filed: Aug. 1, 1980

[51] Int. Cl.³ .............................................. H01C 10/00
[52] U.S. Cl. .................................... 338/195; 338/25; 338/308; 338/320
[58] Field of Search ................. 338/195, 25, 319, 320, 338/260, 307–308; 73/362 AR; 29/610, 620

[56] References Cited

U.S. PATENT DOCUMENTS

| | | | |
|---|---|---|---|
| 1,586,240 | 5/1926 | Cope | 338/195 |
| 2,261,667 | 11/1941 | Stroszeck | 338/195 |
| 3,532,556 | 10/1970 | Steede | |
| 3,629,776 | 10/1967 | Watano | |
| 3,699,650 | 12/1972 | Cocca | |
| 3,776,040 | 12/1973 | Gould | 338/195 |
| 3,781,749 | 12/1973 | Iles et al. | |
| 3,881,162 | 4/1975 | Caddock | 29/620 X |
| 4,028,657 | 6/1977 | Reichelt | |
| 4,041,440 | 8/1977 | Davis et al. | 29/620 X |
| 4,050,052 | 9/1977 | Reichelt et al. | |
| 4,146,957 | 4/1979 | Toenshoff | 29/620 |

*Primary Examiner*—C. L. Albritton
*Attorney, Agent, or Firm*—Biebel, French & Nauman

[57] ABSTRACT

A transducer for measuring temperature by means of the temperature-induced resistance change of a coil of wire includes, connected to the coil, a deposited film whose resistance-versus-temperature characteristic is substantially the same as that of the wire. The complete transducer assembly is calibrated at a fixed temperature by physically removing portions of the deposited film until a desired resistance is attained. The bulk of the resistance is contributed by the wire, while the film contributes only a small percentage of the total. The transducer thus maintains the desired precision, repeatability and stability of a wirewound transducer while at the same time being capable of calibration by trimming techniques commonly used for adjusting film resistors.

4 Claims, 4 Drawing Figures

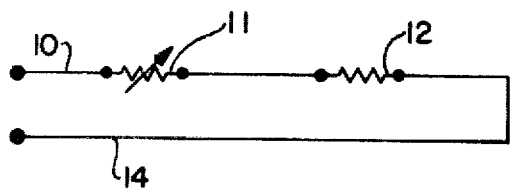
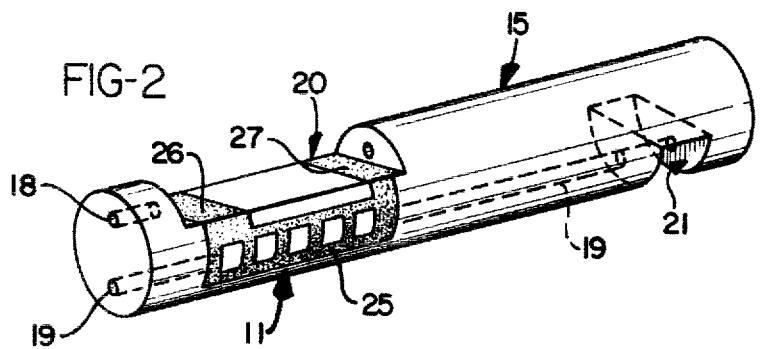
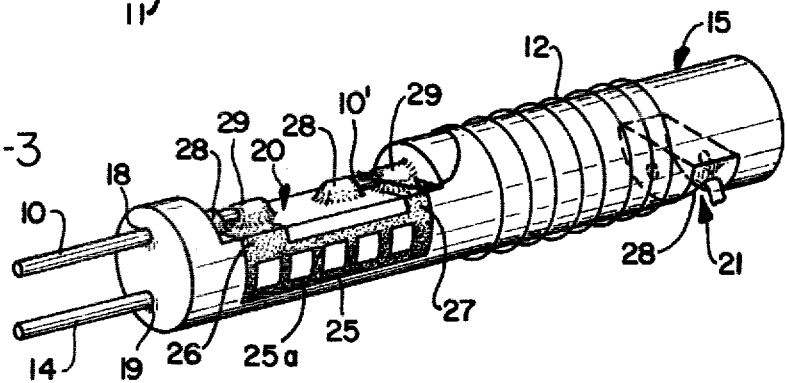
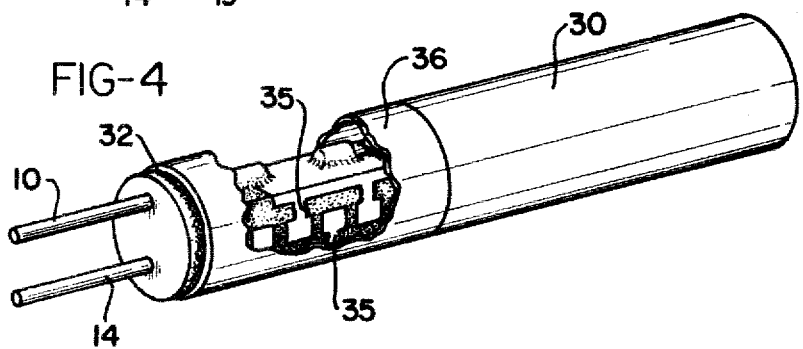

TRIMMABLE WIREWOUND RESISTANCE TEMPERATURE TRANSDUCER

BACKGROUND OF THE INVENTION

This invention relates to a transducer for measuring temperature by means of thermally-induced resistance changes. More particularly, this invention relates to a transducer which primarily consists of a length of temperature-sensitive wire, but which also includes as a portion of the total resistance a deposited conductive film which is not wire.

It is well known that certain metals exhibit known and repeatable changes in resistance with temperature. This phenomenon has been put to practical use by creating temperature transducers which are coiled-up lengths of wire. Generally the coils are wound with fine gauge wire in order to obtain a practical resistance in a small space and to minimize the cost of sometimes expensive metals. Platinum is universally acknowledged as the optimum material for this use, as it possesses excellent stability and repeatability over a wide range of temperatures. Nickel, copper, and other less expensive metals are commonly used over relatively narrow temperature ranges. Many physical configurations presently exist for wirewound temperature transducers.

For optimum stability and repeatability, the wire should be pure, should be wound in a manner which minimizes or eliminates strain and stress on the wire and should be fully annealed after winding. Otherwise, repeated temperature cycling will induce stresses which will change the wire's resistance by both stretching and work-hardening it. Extended time at elevated temperatures will tend to anneal the wire, which also will change its resistance. Impurities will cause deviations from the known characteristics of the wire, and depending on the impurity, may cause the wire's resistance to change with time.

The manufacture of wirewound resistance transducers requires care and attention to detail in order to wind the coil to the correct resistance. For platinum, a resistance error of only 0.1% produces a measurement error of 0.25° C. or more, depending on the temperature being measured. The resistance is affected by the length and diameter of the wire, by stretching during winding and by variations in the amount of resistance change seen during annealing. Since each of these effects individually may easily exceed 0.1%, it is difficult, and therefore expensive, to produce precision temperature transducers. Often, even though great care is taken, a substantial portion of the transducers produced may not meet their required tolerances and must be discarded. This further serves to increase costs.

Platinum resistance thermometers (PRTs) historically have provided precise, highly repeatable temperature measurement. In the standards laboratory interpolations made using strain-free, high purity, carefully handled wirewound PRTs define temperatures on the International Practical Temperature Scale between certain fixed freezing or boiling points in the range from −183° C. to +631° C. Industrial wirewound PRTs, which generally compromise the strain-free design to provide ruggedness and which sometimes are purposely "doped" with impurities to approximate the resistance-versus-temperature tables of DIN 43760 (1), nevertheless provide the best practical accuracy and repeatability for measuring temperatures from −200° C. to +650° C.

Methods exist to adjust the length (and therefore the resistance) of the wire. For instance, a small loop of wire may be left exposed so that after annealing, a short portion of the loop may be pinched off with a small welder to reduce the overall length of the wire. This overcomes the above-mentioned tolerance problems, but introduces problems of its own. A typical transducer for industrial and commercial use will have a resistance of 100 ohms at 0° C. and will be made of platinum wire having a diameter around 0.001 inches. The overall length of the wire will be approximately 20 inches. After annealing, the wire will be exceedingly soft and delicate and, in addition, will be difficult to see without substantial magnification. The length of wire to be pinched off will be small; for example, a tolerance of ±0.1% (±0.25° C.) will correspond to an overall length adjustment tolerance of ±0.02 inches or, when pinching off a loop, will require that the loop length be adjusted in increments of 0.01 inches or less. Such adjustment typically will need to be made by hand under a microscope, then verified by remeasurement in a constant-temperature bath. After adjustment, of course, the exposed loop will need to be protected from damage and restricted such that it does not further short-circuit to itself.

Recently, several manufacturers have introduced resistance temperature transducers created by depositing conductive films, generally platinum, onto nonconductive substrates such as aluminum oxide. One example of such a device is given in U.S. Pat. No. 4,146,957 (Toenshoff). In this example, a serpentine pattern of platinum thick film paste is deposited on a ceramic substrate. As described in the patent, the paste is formulated using high purity platinum (99.9% pure or better) and contaminant-free frit (glass) in an organic binder. The deposition is made using silk-screen techniques, followed by firing at a high temperature (at least 1450° C.). Other manufacturers are known to be depositing platinum films using thin-film techniques, in which the platinum is deposited by vapor deposition methods.

Resistance film transducers offer advantages in ruggedness and cost. The film, being bonded directly to the substrate, is inherently more rugged than a strain-free coil of wire. The film deposition is done using high volume automated or semiautomated techniques. Finally, although the film as deposited generally is not better than ±20% precision, it is easily and quickly trimmed to value using air abrasive, scribing or laser techniques.

Film transducers generally fall short of strain-free wirewound transducers in performance. Because the film is bonded directly to the substrate, it exhibits strain effects as the temperature changes. This not only affects the the resistance-versus-temperature characteristics but also produces permanent shifts in resistance after excursions to extended temperatures. The films generally lack the stability of pure, solid platinum wire.

SUMMARY OF THE INVENTION

This invention relates to a resistance temperature transducer which substantially exhibits the desirable performance characteristics of a wire-wound temperature transducer but which is easily adjustable by techniques commonly used to adjust film resistors.

In the preferred embodiment of the invention, the temperature transducer is constructed on a cylindrical ceramic mandrel which includes two lead wires by which the user may connect the transducer to the measurement apparatus. The transducer of this invention is basically a wirewound element designed to provide the highest possible precision and repeatability. A small portion of the resistance, however, consists of platinum film, giving the element the advantage that it may be precisely trimmed. This eases the manufacturing process and reduces losses due to out-of-tolerance devices, while at the same time combining the best possible initial accuracy with the stability of high purity, strain-free wire. The film is formed as a pattern of thick film platinum paste deposited on a portion of the mandrel and connected at one end to one of the two lead wires. A strain-free coil of pure platinum wire is wound on the remainder of the mandrel and is connected at one end to the free end of the platinum film stripe and at the other end to the second lead wire. The length of the wire is controlled to be just below the desired transducer resistance.

The coil is encapsulated without covering the platinum film, and the transducer is annealed by exposure to an elevated temperature. After annealing, the transducer is placed in a controlled temperature bath and the exposed film selectively removed until the transducer attains the desired resistance. Finally, the film is coated for protection and electrical insulation. Typically, the wire comprises about 98 to 99% of the total transducer resistance and the film about 1-2%. Thus, the characteristics of the transducer are substantially those of the wire.

It is, therefore, an object of this invention to provide a resistance temperature transducer wherein the resistance is composed primarily of wire but partially of a deposited film, such that the transducer retains the desirable precision, stability and repeatability of a wirebound sensor and yet is easily adjustable by techniques commonly used to adjust film resistors.

A further object of the invention is the provision of a transducer as outlined above in which the smaller film portion of the total resistance is formed in a pattern so that selected portions thereof are trimmable to provide small increases in the total resistance.

Another object is the provision of a resistor or temperature transducer on a ceramic mandrel including wire and film resistance materials connected in series.

Other objects and advantages of the invention will be apparent from the following description, the accompanying drawings and the appended claims.

BRIEF DESCRIPTION OF THE DRAWINGS

FIG. 1 is an electrical schematic of the preferred embodiment of the invention;

FIG. 2 is a perspective view of the ceramic mandrel showing the film deposited thereon;

FIG. 3 is a perspective view of the ceramic mandrel, and showing the film and wire on the mandrel, and the lead wires in place; and FIG. 4 is a partially cut-away view of a finished resistor, showing the adjustment of the deposited film.

DESCRIPTION OF THE PREFERRED EMBODIMENT

Referring to the electrical schematic diagram of FIG. 1, the preferred embodiment of the invention includes a first connection lead wire 10, an adjustable temperature-sensitive resistor 11, a fixed temperature sensitive resistor 12 and a second connection lead 14 all connected in series. The adjustable resistor 11 comprises a deposited platinum film while the fixed resistor 12 comprises a coil of platinum wire.

As shown in FIG. 2, the resistance portions of the temperature transducer are constructed and supported on a generally cylindrical ceramic aluminum oxide mandrel 15 which has two holes 18 and 19 extending lengthwise through it. Two transverse slots 20 and 21 are cut far enough into the mandrel to completely expose hole 18 near one end and hole 19 near the other end. Slot 20 is wider than slot 21. The resistor 11 includes an intermediate "ladder network" pattern 25 of platinum thick-film paste deposited on the exposed surface of the mandrel 15. Stripes or portions 26 and 27 of platinum paste are painted from each end of the ladder network pattern 25 onto the flat area of the wide slot 20 as shown. The mandrel is then fired to fuse the paste to the mandrel. The thick film platinum of resistor 11 is deposited using a modified screen printer. It is a paste formulated from high purity platinum and contaminant-free glass by Englehard Minerals and Chemicals Corporation. It is similar to pastes currently used in thick film platinum resistance thermometers for industrial and automotive use. The high purity, plus proper application and firing techniques, provide a resistance-versus-temperature characteristic which is reasonably similar to pure platinum. A suitable firing technique is as disclosed in Tonenshoff, U.S. Pat. No. 4,146,957, including one-half hour heating cycle to peak temperature, one-quarter hour holding at peak temperatures, and one-quarter hour for cooling, with a peak temperature of about 1400° C. to 1500° C.

Referring now to FIGS. 2 and 3, two platinum connection leads 10 and 14 are inserted through holes 18 and 19 to extend into slots 20 and 21, respectively. The end of lead 14 is brought slightly out of slot 21 for attachment to the wire. A stub lead 10' which may be a segment of the lead 10 is inserted in the opening 18 at the far end of the slot 20. In the wide slot 20 the leads 10 and 10' are covered over with platinum paste 29 to connect them respectively to the two end portions 26 and 27 of the film resistor 11. On areas away from the platinum paste, and also in the narrow slot 21, the ends of the wires are covered with a paste of glass frit 28. The assembly is then fired again to fuse the platinum and glass in place. The platinum paste 29 creates an electrical connection between the leads 10 and 10' and the platinum film, while the glass creates a strong mechanical bond between the lead wires and the mandrel. If desired, the lead 10 in the wide slot may be cut or severed after firing to form the portion 10' so that it no longer bridges the ladder network.

The fixed temperature-sensitive resistor 12 is then created by winding a length of fine-gauge platinum wire (such as 0.001 inch diameter) on the mandrel 15, bonding the wire at one end to the adjustable resistor 11 at the stub 10' and at the other to the exposed end of lead wire 14 in the slot 21. In the preferred embodiment, the wire is coated with an insulating varnish such as the varnish known as Isonel 200 . The length of wire is chosen such that the nominal total resistance will be about one-half percent lower than in a conventional wirewound element.

Referring now to FIG. 4, a first ceramic outer sleeve 30 is placed over the portion of the mandrel 15 on which wire coil 12 has been wound. The sleeve 30 extends at one end just past the area on which the coil has been bonded to resistor 11. At the other end, the sleeve extends slightly beyond the end of the mandrel. At the end nearest resistor 11, the sleeve is held in place using a high-temperature ceramic cement 32. After the cement is cured, the space between the mandrel and the sleeve 30 is filled with a slurry of ceramic powder. The assembly is centrifuged to pack the powder firmly in place and, if necessary, if filled and centrifuged again until the entire space is filled with packed ceramic powder. The powder is dried by exposure to heat, after which the open end of the sleeve 30 is filled and closed with high temperature ceramic cement.

The assembly is then heated to a high temperature, such as 700° C., for several hours. This accomplishes two purposes. First, the varnish or insulation on the coil of wire 12 is volatilized and driven out of the assembly. This leaves a small space, or tunnel, around each turn of the coil so that the wire, while constrained generally by the mandrel and by the packed ceramic powder, is free to move within the confines of the tunnel. This eliminates undesirable strain effects, such as might otherwise occur due to unequal temperature coefficients of expansion between the mandrel and the wire. Second, the wire is annealed by the exposure to high temperature, enabling it to behave according to the well-known temperature characteristics of pure, strain-free platinum.

At this point the element is essentially complete. All manufacturing tolerance errors have occurred, the shift during annealing has taken place and the strain-free, annealed coil of fine-gauge wire is fully encapsulated. The wire becomes extremely soft and fragile after annealing. Only the platinum film, which is relatively rugged, is left exposed.

Typically, it is desired that the completed transducer have a resistance as close as possible to 100.00 ohms at a temperature of 0° C. The transducer as assembled and annealed is constructed so that the nominal total resistance of the film 11 and the coil 12 is 99.5 ohms, of which the film contributes perhaps 0.8 ohms. With only moderate care, virtually all of the sensors produced will be between 99 and 100 ohms in resistance at 0° C.

The transducer is connected to a precision measurement bridge and inserted into a well controlled constant temperature bath of silicone oil or other nonconductive liquid. The temperature usually is controlled at 0° C., but other temperatures may be used if appropriate. The ladder network 25 is trimmed by scribing away one or more links 25a, as shown at 35 in FIG. 4, until the desired total resistance is reached. Scribing alternature opposing links provides a relatively large increase in resistance; scribing adjacent links provides fine adjustment when nearing the final value. A tolerance of ±0.25° C. (or ±0.1% of resistance) is easily attained: a substantial number of elements fall within ±0.1° C. After trimming, a second sleeve 36 is cemented over the trimmed area as shown in FIG. 4, and the transducer is complete.

The ability to trim the transducer virtually eliminates losses due to out-of-tolerance units, and the fact that the element may be trimmed greatly reduces the need for precise control of the length of the wire coil 12. The resultant savings more than offset the added costs of film deposition. Finally, for optimum precision at a specific temperature, the transducer may be trimmed at the required temperature.

Although the foregoing describes a preferred embodiment, it should be apparent that other realizations of these principles are possible. A variety of designs and construction techniques are know to those skilled in the art of wirewound resistance temperature transducers, and any of these could be adapted to include a deposited film for adjustment. The materials need not be those described here; other metals such as nickel and copper are commonly used to create temperature transducers. The film may be any material possessing nominally the desired temperature characteristics and the mandrel or supporting structure may be any ceramic, glass or other insulating material appropriate for the temperatures to be measured. The coil need not be strain-free if a strained wire is capable of yielding the desired accuracy. Depending on the materials chosen, and especially on the relative resistances of the wire and the film, it may be desirable for the film to be connected in parallel with the coil, rather than in series.

The film need not be deposited using thick film techniques, need not be in the form of a ladder network, and need not be adjusted by scribing. For example, the film may be deposited using well-known vapor deposition techniques and may be adjusted using an air-abrasive sandblaster or a laser. The film also could be adjusted via a sliding connection or movable tap.

It should also be apparent that, by using wire and film having low temperature coefficients of resistance, a precision resistor having a temperature coefficient near zero may be created. Since precision wirewound resistors generally suffer from the same tolerance considerations as outlined here, the combination of a coil of high quality resistance wire plus a film resistance for adjustment could lead to the efficient production of low temperature coefficient, high precision resistors.

In standards laboratory thermometry, it is necessary that the platinum be as pure, strain-free and completely annealed as possible in order to conform to the well-documented behavior of pure platinum. The condition of a platinum thermometer is indicated by its resistance-versus-temperature slope, or sensitivity. Impurities, strain or metallographic defects all serve to lower the thermometer's slope. More importantly, the effects of impurities, strain or defects tend to change with time, especially if the thermometer is cycled or exposed to extreme temperatures. For a thermometer to be used as an interpolation standard for definition of the International Practical Temperature Scale it is required that its average slope over the interval from 0° to 100° C. be at least 0.003925 ohms/ohm/°C.

Considerations of ruggedness and cost generally force industrial PRTs to be somewhat below this ideal sensitivity, however, manufacturers offer elements having sensitivities of 0.003920 ohms/ohm/°C. or better. Most manufacturers also offer elements purposely doped with impurities to meet the DIN 47360 standard. This standard, based on earlier art, specifies a PRT with a sensitivity of 0.003850 ohms/ ohm/°C. over the 0° to 100° C. interval. This sensitivity also is specified in a draft standard being written by the International Electrotechnical Commission (IEC). Although a bit less than "ideal" than pure platinum, these sensors generally perform well over their rated temperatures.

It is difficult, if not impossible, for deposited platinum films to achieve a slope of 0.003920 ohms/ohm/°C. Because the film is firmly attached to a substrate, it cannot be free from strain effects. The metallurgy of a deposited film, especially a thick film, is not the same as bulk platinum. The highest sensitivity films known to the applicant are those attaining the DIN slope of 0.003850 ohm/ohm/°C., and requires careful processing in that the film is less stable than platinum wire.

The platinum film resistor 11 preferably comprises 2% or less of the total resistance, depending on the amount of the trim needed. The film thus contributes not more than 2% to the slope and stability of the total element. The element, while as easily trimmed as a film element, essentially equals the performance of a strain-free wirewound element.

While the form of apparatus herein described constitutes a preferred embodiment of this invention, it is to be understood that the invention is not limited to this precise form of apparatus, and that changes may be made therein without departing from the scope of the invention.

What is claimed is:

1. A precision resistance element comprising a generally cylindrical ceramic mandrel,
   means in said mandrel defining a pair of spaced transversely extending slots separated by an intermediate portion,
   a pair of leads extending axially through said mandrel with one each of said leads in intersecting relation with one of said slots,
   a platinum wire wound on said intermediate portion having one end thereof connected to one of said leads at one of said slots,
   a platinum film deposited on a surface of said mandrel having portions thereof extending into the other of said slots,
   means connecting one of said film portions to the other of said leads and another of said film portions to the other end of said wire whereby said film is connected in series with said wire with said leads,
   said film further having an intermediate trimmable portion on an exposed surface of said mandrel exteriorly of said other slot by means of which the overall resistance of said element may be adjusted, and
   sleeve means extended over said wire protecting said wire against damage.

2. The precision resistance element of claim 1 in which said intermediate film portion is formed in a pattern with exposed removed portions thereof which may be physically removed for varying the resistance thereof.

3. The element of claim 2 in which said pattern comprises a ladder pattern.

4. A precision resistance element comprising a generally cylindrical ceramic mandrel,
   means in said mandrel defining a pair of spaced transversely extending slots separated by an intermediate portion,
   a pair of leads extending axially through said mandrel with one each of said leads in intersecting relation with one of said slots,
   a wire comprising approximately 98-99% of the total resistance of said element wound on said intermediate portion having one end thereof connected to one of said leads at one of said slots,
   a conduction film comprising the remaining portion of the total resistance of said element deposited on a surface of said mandrel having portions thereof extending into the other of said slots,
   means connecting one of said film portions to said leads whereby said film is connected in circuit with said wire and said leads, and
   said film further having an intermediate trimmable portion by means of which the overall resistance of said element may be adjusted.

* * * * *